US011776080B2

(12) United States Patent
Grau

(10) Patent No.: US 11,776,080 B2
(45) Date of Patent: Oct. 3, 2023

(54) AUTOMATICALLY GENERATING A PERSONALIZED COURSE PROFILE

(71) Applicant: Pearson Education, Inc., New York, NY (US)

(72) Inventor: Christoph Grau, Zurich (CH)

(73) Assignee: PEARSON EDUCATION, INC., New York, NY (US)

( * ) Notice: Subject to any disclaimer, the term of this patent is extended or adjusted under 35 U.S.C. 154(b) by 1353 days.

(21) Appl. No.: 15/783,547

(22) Filed: Oct. 13, 2017

(65) Prior Publication Data
US 2018/0130156 A1 May 10, 2018

Related U.S. Application Data

(60) Provisional application No. 62/419,883, filed on Nov. 9, 2016.

(51) Int. Cl.
| | | |
|---|---|---|
| G06Q 10/00 | (2023.01) | |
| G06Q 50/20 | (2012.01) | |
| G06F 16/248 | (2019.01) | |

(52) U.S. Cl.
CPC ....... *G06Q 50/2057* (2013.01); *G06F 16/248* (2019.01)

(58) Field of Classification Search
CPC .......... G06Q 50/2057; G06Q 10/1053; G06Q 10/063112; G06Q 10/06398; G06Q 10/105; G06Q 10/0637; G06Q 10/083; G06Q 20/20; G06Q 20/3276; G06Q 20/3278; G06Q 30/02; G06Q 30/0236; G06Q 30/08; G06Q 40/02; G06Q 40/025; G06Q 40/06; G06Q 50/10; G06Q 50/16; G06Q 50/188; G06F 16/248; G06F 705/328
See application file for complete search history.

(56) References Cited

U.S. PATENT DOCUMENTS

2002/0049750 A1* 4/2002 Venkatram ............. G06N 5/022
2003/0187723 A1* 10/2003 Hadden .................... G09B 7/00
705/7.42

(Continued)

OTHER PUBLICATIONS

V. Slavuj, B. Kovačić and I. Jugo, "Intelligent tutoring systems for language learning," 2015 38th International Convention on Information and Communication Technology, Electronics and Microelectronics (MIPRO), Opatija, Croatia, 2015, pp. 814-819, doi: 10.1109/MIPRO.2015.7160383.*

*Primary Examiner* — Gabrielle A McCormick
(74) *Attorney, Agent, or Firm* — QUARLES & BRADY LLP

(57) ABSTRACT

The present invention provides for one or more server computers configured to receive user input from a user interface (UI) comprising a first and second job description. The server queries a database to identify a first and second competency score associated with the first and second job descriptions respectively. The server then generates a personalized course profile comprising a plurality of objectives stored in the database and each associated with a third competency score between the first and second competency scores. The server then renders a second UI including an ordered list of the objectives and UI controls for accessing assets associated with the objectives. The server then transmits the second UI to a client computer for display.

18 Claims, 6 Drawing Sheets

---

File Edit Tools

Senior Marketing Manager - GSE 50 - Description  Similar Job Titles  Key Tasks
Marketing Executives - Marketing

| Learning Objective | Skill | GSE |
|---|---|---|
| Can respond effectively to emails requesting work info | WRITING | 64 |

Begin Course  Ask a Question  Submit Assignment  Take Assessment

CONGRATULATIONS! You have submitted all assignments and taken all assessments ahead of deadlines. If you keep this up, you will complete the course well ahead of your goal date of January 1, 2017! You have also scored above 95% on all assignments and assessments. KEEP UP THE GREAT WORK!

You have also completed the self-study portion of this learning objective. We will now pair you with no more than 4 additional students for the peer-to-peer portion of the learning objective, before moving on to the instructor-led portion of the learning objective.

Based on data from your user profile, we recommend the following users to be on your team. Please select your top 4 choices:

| User | Profile Attributes |
|---|---|
| John Doe | Needs some motivation, leadership not preferred, completed all assignments ahead of schedule, high scores on assessments    Add    Delete |
| Jane Doe | Enjoys and shows leadership, ambitious, motivated, completed all assignments on time, high scores on assessments    Add    Delete |

(56) References Cited

U.S. PATENT DOCUMENTS

| | | | | |
|---|---|---|---|---|
| 2005/0187802 A1* | 8/2005 | Koeppel | ............... | G06Q 30/02 |
| | | | | 705/4 |
| 2006/0008781 A1* | 1/2006 | Townshend | ......... | G09B 17/006 |
| | | | | 434/178 |
| 2011/0010306 A1* | 1/2011 | Gonzalez | .............. | G06Q 10/10 |
| | | | | 705/326 |
| 2013/0282606 A1* | 10/2013 | Bhagat | .............. | G06Q 10/1053 |
| | | | | 705/321 |
| 2014/0099082 A1* | 4/2014 | Miller | ..................... | H04N 5/93 |
| | | | | 386/285 |
| 2014/0245184 A1* | 8/2014 | Cheng | ................... | G06Q 50/01 |
| | | | | 715/753 |
| 2016/0048583 A1* | 2/2016 | Ontko | ..................... | G09B 7/00 |
| | | | | 707/769 |
| 2016/0196534 A1* | 7/2016 | Jarrett | ............... | G06Q 10/1053 |
| | | | | 705/321 |
| 2016/0275636 A1* | 9/2016 | Olenick | ............. | G06F 16/9535 |

* cited by examiner

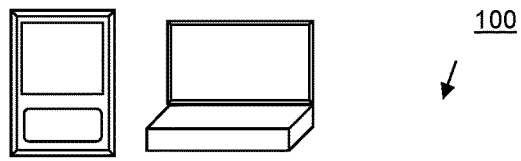
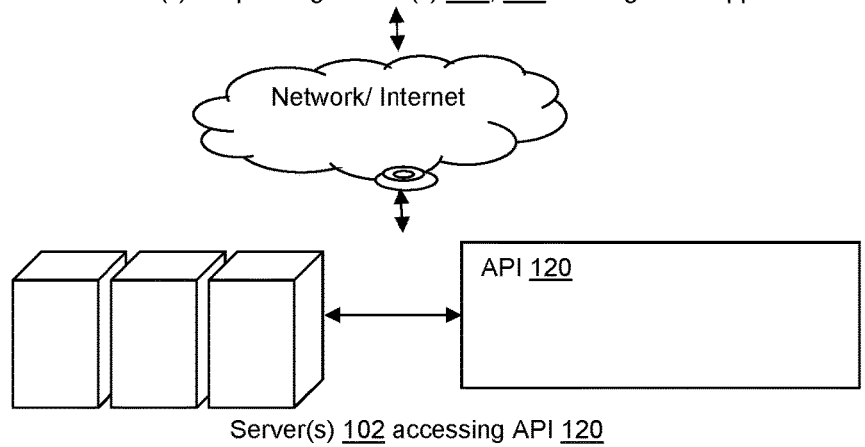
Client Terminal(s)/Requesting Device(s) 104, 106 running client applications
Server(s) 102 accessing API 120
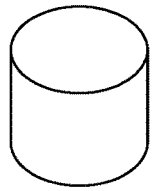
Data Store/Databases 110 storing mapping data, language level data, job profile data, learning objective data, etc.
FIG. 1

| File Edit Tools |

Personalized Course Tool for Career Goals

| Type in your career goals ... |

Current Job Description  Desired Job Description

| Jr. Marketing Manager ▽ |   | Sr. Marketing Manager ▽ |

Career-Oriented Learning Objectives

| Improve my capabilities to communicate and socialize with others ▽ |

Rate Goal Weight (1-10 Scale)   Goal Date

| Speaking ▽ | 10 |   | March 1, 2017 ▽ |

| SUBMIT |

FIG. 3

File  Edit  Tools

Senior Marketing Manager - GSE 50 - Description    Similar Job Titles    Key Tasks
Marketing Executives - Marketing

| Learning Objective | Skill | GSE | |
|---|---|---|---|
| Can respond effectively to emails requesting work info | WRITING | 64 | Delete |
| Can write a business report using a standard template | WRITING | 61 | Delete |
| Can identify key details in work-related documents | READING | 54 | Delete |
| Can write a sample summary of factual work info | WRITING | 53 | Delete |
| Can write a short sample business report | WRITING | 50 | Delete |
| Can write a short report on a work task or event | WRITING | 49 | Delete |

FIG. 4

| File  Edit  Tools     ⇦ ⇨ |

Senior Marketing Manager - GSE 50 - Description    Similar Job Titles    Key Tasks
Marketing Executives - Marketing Learning Objective                                              Skill            GSE Can respond effectively to emails requesting work info   WRITING      64

Begin Course    Ask a Question    Submit Assignment    Take Assessment

CONGRATULATIONS! You have submitted all assignments and taken all assessments ahead of deadlines. If you keep this up, you will complete the course well ahead of your goal date of January 1, 2017! You have also scored above 95% on all assignments and assessments. KEEP UP THE GREAT WORK!

You have also completed the self-study portion of this learning objective. We will now pair you with no more than 4 additional students for the peer-to-peer portion of the learning objective, before moving on to the instructor-led portion of the learning objective.

Based on data from your user profile, we recommend the following users to be on your team. Please select your top 4 choices:

| User | Profile Attributes |
|---|---|
| John Doe | Needs some motivation, leadership not preferred, completed all assignments ahead of schedule, high scores on assessments    Add    Delete |
| Jane Doe | Enjoys and shows leadership, ambitious, motivated, completed all assignments on time, high scores on assessments    Add    Delete |

FIG. 5

AUTOMATICALLY GENERATING A PERSONALIZED COURSE PROFILE

CROSS-REFERENCE TO RELATED PATENT APPLICATIONS

This application is a provisional conversion of application 62/419,883 filed Nov. 9, 2016, and titled "Automatically Generating a Personalized Course Profile."

FIELD OF THE INVENTION

The present invention generally relates to systems and methods for determining competency (e.g., language skill) score of a user, and generating a personalized course profile for the user defining objectives required for the user to achieve professional goals.

SUMMARY OF THE INVENTION

The present inventions provide methods and systems comprising one or more server computers communicatively coupled to a network and including one or more processors executing instructions in a memory coupled to the server computer, the instructions causing the server computer to: receive user input from a user interface (UI) comprising a first and second job description. The server queries a database to identify a first and second competency score associated with the first and second job descriptions, respectively. The server then generates a personalized course profile comprising a plurality of objectives stored in the database and each associated with a third competency score between the first and second competency scores. The server then renders a second UI including an ordered list of the objectives and UI controls for accessing assets associated with the objectives. The server then transmits the second UI to a client computer for display.

The above features and advantages of the present invention will be better understood from the following detailed description taken in conjunction with the accompanying drawings.

BRIEF DESCRIPTION OF THE DRAWINGS

FIG. 1 is block diagram of an example embodiment of a system for automatically generating a personalized course profile.

FIG. 3 is an example user interface used in an example embodiment of a system for automatically generating a personalized course profile.

FIG. 4 is an example user interface used in an example embodiment of a system for automatically generating a personalized course profile.

FIG. 5 is an example user interface used in an example embodiment of a system for automatically generating a personalized course profile.

DETAILED DESCRIPTION

Figure 2:
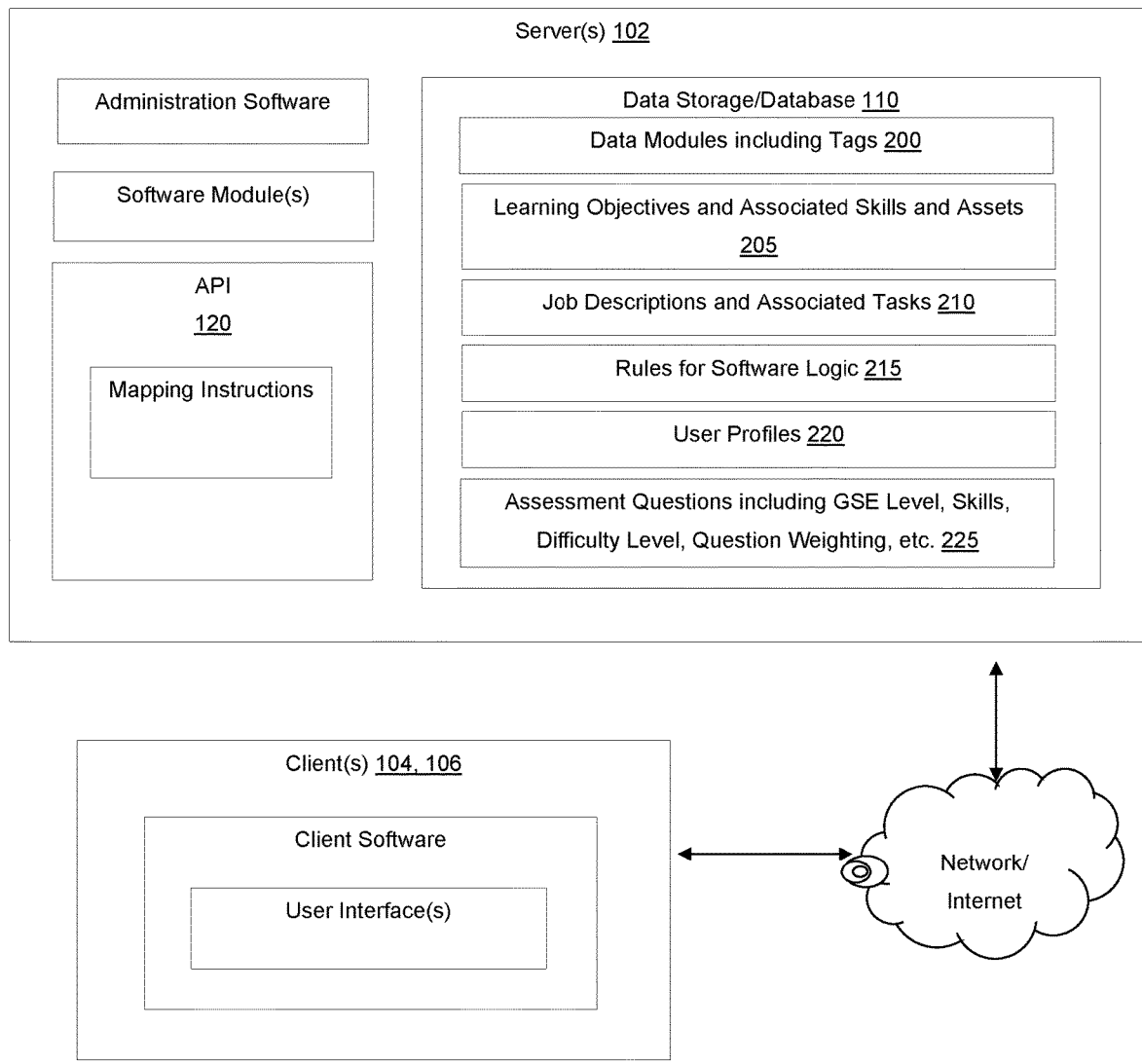
FIG. 2 is a more detailed block diagram of an example embodiment of a system for automatically generating a personalized course profile.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Global organizations increasingly view English language skill as a core competency for their employees. However, most recruiters, functional managers, and HR team members do not have the expertise or tools needed to objectively evaluate their employees' English skills. Organizations and potential employees can benefit from a better understanding of the specific English skills required to perform a particular job and the current skill level of those who seek to do that job. It would be advantageous for users to have access to a system that provides a consistent and precise method for understanding and assessing the English language skills needed for a particular job. Specifically, job seekers would benefit from a system that evaluates the career goals of particular employees and candidates, and generated a personalized course profile defining a series of learning objectives, skills and/or tasks that the employees or candidates must master to qualify for a job matching a job description for the employee or candidate's defined career goals.

One option available for such employees or candidates to improve their English skills is to attend a Private Language School (PLS). Many learners want to learn English, but most learning takes place in an analog, rather than a digital, environment. Although the number of English language learners is constantly growing, the industry is still very traditional. These traditional (and even current) PLS models (e.g., LAUREATE EDUCATION, INC, XDF.CH, CUTURA INGLESA, ENGLISH LANGUAGE CENTRES, etc.) have adoption problems and legacy issues. Currently, courseware is sold through the traditional PLS model, but digital readiness can affect the usage of digital products, causing these models to struggle with the innovator's dilemma and making it difficult to transform themselves. In other words, in several instances, the traditional PLS model cannot successfully transition their business models to a digital environment. Their model requires a painful transformation from a traditional PLS model to a digital model. Current learning environments also do not provide a ubiquitous mobile delivery and social experience designed around, and resonating with, the millennial generation.

By contrast, for 10 years, start-ups (e.g., BUSUU, OPEN ENGLISH, DUOLINGO, +BABBEL) have been trying to disrupt the market, but struggle with student retention as their courses are not pedagogically sound enough, which means that the initial high customer acquisition costs are unsustainable. Furthermore, the typical start-up models, which simply replicate the traditional school models, lack pedagogically sound courseware and therefore the ability to measure the efficacy of their products. They promote their courses purely around a great experience. Thus, current learning environments include one, but not both, of the two elements necessary for a successful digital learning environment. Specifically, the two elements include a pedagogically sound and a financially viable digital language learning experience. However, neither the traditional PLS nor the start-ups have so far delivered such a pedagogically sound and economically viable digital language learning experience.

The disclosed embodiments reinvent the traditional PLS model and create a Virtual PLS model for the language learners, moving the model into the digital age and creating a global and purely digital business opportunity that overcomes adoption problems, and helps improve the environment for learners of English language skills.

Specifically, the disclosed embodiments provide global and pure digital business opportunities overcoming existing adoption problems and legacy issues, and successfully provide a pedagogically sound and financially viable digital language learning environment. The disclosed embodiments include a data-driven self-study component within personalized courses, allowing a server to measure the efficacy of the course and promote a model around course quality. The disclosed embodiments offer language courses personalized to each user of the disclosed virtual PLS, including the length and depth of the courses, based on their professional goals, as well as personalized to the user's personality and learning styles.

The disclosed embodiments further offer a virtual PLS experience including ubiquitous mobile delivery and social aspects designed, targeted to, and resonating with, the expectations of the Millennial generation (born between 1980 and 2000). As non-limiting examples, customers may include English language learners with a professional and personal need to learn English, but as members of the Millennial generation, are not willing to use a traditional PLS.

Additionally, the disclosed embodiments provide a financial model applying proven digital economics (e.g. roughly analogous to the UBER employment model). These proven digital economic financial models bring down fixed costs, thereby making digital learning more affordable. A pedagogically sound self-study component in the course organizations can decrease the costs for teachers in this model. The exemplary embodiments are described with respect to evaluation of English language proficiency, but it will be understood that the systems and methods may be used to evaluate other job skills using a relevant scoring framework, as desired.

The disclosed learning objectives within the personalized course profile may be obtained from a scoring methodology, such as the Global Scale of English (GSE), and therefore each learning objective may have a score (e.g., on a scale of 10 to 90 for GSE) associated therewith. Furthermore, each learning objective may identify an audience to which it pertains. For example, the GSE framework of learning objectives is divided into four audiences: young learners, Adult learners of General English, learners of academic English, and Learners of Professional English.

The GSE is a standardized, granular scale from 10 to 90, which measures English language proficiency in each of four functional skills: listening, reading, speaking and writing. The GSE is also used within the disclosed embodiments to indicate proficiency levels and enable skills for grammar and vocabulary. The GSE is psychometrically aligned with the Common European Framework of Reference (CEFR). Unlike other frameworks, which describe attainment in wide bands, the GSE identifies what a learner can do in a more granular way at each point (i.e., integer value) on the scale. It is therefore possible to much more precisely show whether a learner—or a learning objective, as described below—is situated toward the top or bottom, or somewhere in the middle, of a comparatively wide-banded level (e.g., the six wide levels of the CEFR).

The CEFR and the GSE each include a framework of learning objectives with which the scores on the scale are associated. The CEFR and GSE models describe the development of proficiency as quantitative (i.e., how many tasks someone can perform) and qualitative (i.e., how well they perform them). Hence, the quantitative dimension is expressed in terms of communicative activities, while the qualitative dimension is expressed in terms of communicative competencies. The CEFR and GSE also model and scale communicative strategies, viewed as the link between communicative competencies and communicative activities. According to a user's knowledge and abilities, he or she will employ different strategies when performing a given activity. Each CEFR and GSE learning objective are described in terms of the competency they test, and are associated with one of the six levels of the scale.

The GSE framework extends, and fills gaps in, the framework of the CEFR and modifies the way in which the learning objectives are presented. Much like the CEFR learning objectives, descriptors for GSE learning objectives relate to functional activities (i.e., specific language tasks) in addition to competencies. In particular, the descriptors are typically composed of three consecutive elements: performance, describing the language function itself (e.g., "Can answer the telephone [in English]"); criteria, describing the intrinsic quality of the performance, typically in terms of the range of language used (e.g., "using a limited range of basic vocabulary"); and conditions, describing any extrinsic constraints on the performance (e.g., "with visual support," or "if spoken slowly and clearly"). In order to create a set of learning objectives that can support a more granular scale of measurement, the same task frequently occurs at multiple levels of quality; the quality indicators are included in the learning objective itself (i.e., via the criteria). Sociolinguistic and pragmatic competencies are also included in the wording of the learning objectives themselves, rather than being presented as a separate set.

In the GSE, each integer value, or "score," on the scale is associated with one or more learning objectives in each of the four functional skills. Each integer value/score on the scale is also associated with grammar and vocabulary. Someone who is at a particular point on the GSE possesses a 50% probability of being able to perform the learning objectives at that level. The probability is higher for those learning objectives at a lower level, and the probability is lower for those learning objectives at a higher level. That said, language learning is not necessarily sequential, and a learner might be strong in one area, where he has had a lot of practice or a particular need or motivation, but quite weak in another. For that reason, to say that a learner is cat' a certain level on the Global Scale of English does not mean he has necessarily mastered every GSE learning objective for every skill up to that point. Neither does it mean that he has failed to master any learning objective at a higher GSE score. If an individual is assessed as being at 61 on the scale, it means s/he has a 50% probability of being able to perform learning objectives at that level, a greater probability of being able to perform learning objectives at a lower level, and a lower probability of being able to perform learning objectives at a higher level.

Referring to FIGS. 1-2, a computing system 100 in accordance with the present disclosure includes a primary-executing computing device, such as a server 102 having one or more processors that execute device logic within the processor or contained in memory of the server 102. The server 102 may be a server computer or a system of interconnected server computers, such as a web server, application server, application platform, virtual server, cloud data server, and the like, a personal computer, laptop computer, tablet computer, e-reader, smartphone, personal data assistant, set-top box, digital media player, microconsole, home automation system, or similar computing device having a central processing unit (CPU), microprocessor, or other suitable processor. It should be understood that there could be several cooperating servers 102 of homogenous or varying types, layers or other elements, processes or components, which may be chained or otherwise configured, which can interact to perform tasks such as obtaining data from an appropriate data store that is accessible locally to the cooperating server 102 or remotely over the network. The server 102 can include any appropriate hardware, software and firmware for integrating with the data store as needed to execute aspects of one or more applications for the client device, handling some or all of the data access and business logic for an application. The server 102 may provide access control services and is able to generate content including text, graphics, audio, video and/or other content usable to be provided to the user, which may be served to requesting devices 104, 106 in any suitable format, including Hypertext Markup Language (HTML), Extensible Markup Language ("XML"), JavaScript (including JavaScript Object Notation ("JSON")), Cascading Style Sheets (CSS), or another appropriate client-side structured language. Content transferred to a requesting device 104, 106 may be processed by the requesting device 104, 106 to provide the content in one or more forms including forms that are perceptible to the user audibly, visually and/or through other senses including touch, taste, and/or smell.

The handling of all requests and responses, as well as the delivery of content between a requesting device 104, 106 and the server 102, can be handled by the server 102, such as a web server using an appropriate server-side structured language in this example. It should be understood that operations described as being performed by a single device may, unless otherwise clear from context, be performed collectively by multiple devices, which may form a distributed and/or virtual system. Additionally, the server 102 or another computing device can make the content available to other devices and in other services; this includes distributing the content in any form, such as learning objective data, grammar data, vocabulary data, and other data used by or available to the server 102.

The server 102 typically will include an operating system that provides executable device logic for the general administration and operation of that server 102 and typically will include a computer-readable storage medium (e.g., a hard disk, random access memory, read only memory, etc.) storing instructions that, when executed by a processor of the server, allow the server to perform its intended functions, including the methods steps disclosed herein. Suitable implementations for the operating system and general functionality of the servers are known or commercially available and are readily implemented by persons having ordinary skill in the art, particularly in light of the disclosure. The environment, in one embodiment, is a distributed and/or virtual computing environment utilizing several computer systems and components that are interconnected via communication links, using one or more computer networks or direct connections.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

The device logic configures the processor, and thus the server 102, to perform the processes described herein. In some embodiments, the server 102 may be a web server remote from other devices of the system 100 and communicating with such devices over the internet or another suitable electronic network or combination of networks. The server 102 may implement all or a portion of the disclosed embodiments; the portion of the environment operated by the server 102 may include hardware and/or software modules that implement the disclosed environment and/or user interface (UI) generation techniques described herein.

The server 102 may be in communication, such as via an appropriate electronic communication network, with a client terminal 104, 106 (also referred to herein as a client) in control of a user operating the client. The client 104, 106 may be any suitable computing device, such as a desktop or tablet computer, smartphone or other mobile device, and the like. Communications between the server 102 and the client 104, 106 may be encrypted; a user of the client 104, 106 may be required to provide authentication credentials to use the client 104, 106. The server 102 may be remote from the client 104, 106 as described above, or the server 102 and the client 104, 106 may be the same computing device or discrete computing devices physically connected to each other. In some embodiments, the server 102 may be an environment server operating the entirety of the environment, and a plurality of clients 104, 106 may access the server 102 to perform functions related to the environment. In some embodiments, the server 102 may be operated by a third party, such as a third-party service provider software.

A network, as used herein, can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

The server 102 may include or be in communication, via an electronic network, with one or more data stores 110. Generally as used herein, a data store may be any repository of information that is or can be made freely or securely accessible by the server 102. Suitable data stores include, without limitation: databases or database systems, which may be a local database, online database, desktop database, server-side database, relational database, hierarchical database, network database, object database, object-relational database, associative database, concept-oriented database, entity-attribute-value database, multi-dimensional database, semi-structured database, star schema database, XML or JSON data object database, file, collection of files, spreadsheet, or other means of data storage located on a computer, client, server, or any other storage device known in the art or developed in the future; file systems; and electronic files such as web pages, spreadsheets, and documents. Each of the data stores may be temporary or permanently implemented.

A data store 110 may include information used in any operation. The data store 110 can include several separate data tables, databases, data documents, dynamic data storage schemes and/or other data storage mechanisms and media for storing data relating to a particular aspect of the present disclosure, including without limitation the data structures and UI data described herein. It should be understood that there can be many aspects that may need to be stored in the data store 110, such as user, access rights, mapping, language score, learning objective, information derived via job processing of GSE related data, map/reduce, or other forms of generated intelligence about the GSE, as non-limiting examples, which can be stored in any appropriate mechanisms in the data store 110. The data store 110 may be operable, through logic associated therewith, to receive instructions from the server 102 and obtain, update, or otherwise process data in response thereto. The server 102 may provide static, dynamic or a combination of static and dynamic data in response to the received instructions. Dynamic data, such as data used in web logs (blogs), web or mobile applications and application interfaces, news services and other applications may be generated by server-side structured languages as described or may be provided by the disclosed environment or another content management system ("CMS") operating on, or under the control of, the server 102.

As illustrated, a data store 110 may include a plurality of data created in accordance with the present disclosure. This plurality of data may be a database record or set of records, a file, a data stream, or another suitable stored data structure that includes data associated with the disclosed embodiments.

The data store 110 may include multiple databases or other resources. For example, the data store may include databases for the GSE (a granular scale to measure progress of language learning described above), and for the O*NET database, mapping the GSE to a database structured around job families and job titles.

In some embodiments, like modules are grouped within separate databases or groupings within the databases (e.g., data records in data tables). For example, the GSE scale/score data may be stored in a GSE level database, the mapping of a GSE score to positions in specific industries in another database (e.g., the O*NET database), and the tasks, learning objectives, and/or skills in yet another database.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, JavaScript or TCL, as well as combinations thereof. The server(s) may also include database servers, including those commercially available from Oracle®, Microsoft®, Sybase®, cloudDNA®, and IBM® as well as open-source servers such as MySQL, Postgres, SQLite, MongoDB, and any other server capable of storing, retrieving, and accessing structured or unstructured data, including those at third-party service providers such as AMAZON, MICROSOFT AZURE, or GOOGLE. Database servers may include table-based servers, document-based servers, unstructured servers, relational servers, non-relational servers or combinations of these and/or other database servers.

The present systems can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

Additional data objects may be stored in the same or different databases within the data store 110, including, as non-limiting examples, software, reference, logic rules and/or mapping resources. The databases may also include additional data objects mapping these various resources to each other and to the client software applications that access them.

The architecture of the disclosed system must be configured to handle calculations on an individualized level for potentially millions of users. As disclosed below, server 102 determines an individual, customized, personalized course profile for each user by selecting only data modules 200, learning objectives, skills, assets 205, and other resources needed to achieve the user's professional goals. As such, server 102 must be able to analyze the user's input, generate the personalized course profile, identify the data modules 200 and/or learning objectives 205 accessible to the user which make up the course profile, calculate a price for the course profile (based on the price per data module and number of data modules), and display the assets 205 associated with each module 200 within the personalized course profile.

The architecture for the disclosed embodiments may also be optimized for a mobile environment. For example, a user may access the disclosed software on a mobile device 104 such as a cell phone or a tablet. At other times, the user may access the disclosed software using a desktop or laptop computer 106 running a desktop software. Some features available on desktop software may not be available on mobile platforms, and vice versa. Thus, each data module 200 for each personalized course may further be optimized for its environment or operating software.

As a non-limiting example, mobile applications may be configured to allow a user to "swipe" in any direction to indicate that they like or dislike displayed content within the disclosed embodiments, thereby further customizing their user or course profile, user experience, assessments, preferences, etc. For example, a user may swipe the screen to the left to indicate they like a displayed content, right to indicate they dislike it, up to select A from a multiple choice assessment question, down to select B, etc.

In some embodiments, the data from the UI may be automatically transmitted to an application programming interface (API) 120, which accesses a mapping database and determines the data modules 200 needed to generate the user's personalized course. API 120 may receive the request, including the professional goal, and access a mapping database storing an index to each of the modules to consolidate all disparate modules and needed resources for the user's personalized profile In some embodiments, the server 102 may access data store 110 using API 120. In some embodiments, API 120 (e.g., a representational state transfer ("REST") API) may be configured to enable or facilitate access to the content by another computing device or system. Thus, in disclosed embodiments, server 102 may run business logic, such as building the UI to be displayed on client 104, 106 and the API 120 may execute instances of data searches. In some embodiments, the data may be retrieved from one or more API instances that include an additional layer between the server 102 and the data store 110.

In some embodiments, the search is submitted directly to API 120 as a remote procedure call (RPC) to execute a web service. Each of the web services executed by the API may include customized software instructions generated in such a way as to define the web service's response to the RPC. For example, each RPC may include an identification of the client software application making the request, and API 120 may route the request according to the customized software instructions for that client software application.

This may include querying a mapping database to determine the database or software resources necessary to complete the request. For example, the API/web service may then access database 110 or software resources mapped to the request in the mapping database in order to compare the search criteria with the parameters in the stored resources, and generate the results to the request in the form of a list of resources available to the user. In addition, these resources may be combined to continue to expand in both types of GSE related resources available and the sheer volume of data there. The server may then transmit the search results to the user within the UI on the user's client computer.

In order to maximize efficiencies for locating the data within data store 110, the data objects, as well as all associated system resources and associated client applications, may be indexed within a mapping database. In some embodiments, third party technologies may be used to index the data. As a non-limiting example, ELASTICSEARCH technology may be used to create a high performance environment capable of indexing the data objects according to server's 102 analysis of the received structured data tags and/or data fields for each data object, in order to expose to the API 120, the relationships between the data sources, the available resources, the client applications, and the intended utilization of these assets.

The disclosed embodiments utilize a database model based on a concept of a modular and tagged content database. In other words, the content database is composed of a collection of individual data modules or components 200, each of which may include tags or other metadata. In some embodiments, each of these data modules 200 may comprise a structured data file, such as XML, JSON, CSV, etc., or one or more database records within a database 110. Data modules 200 may include any independent element combined together to create a personalized course profile for each user's career path development. Data modules 200 may therefore include any resources needed, and the relationships between the data modules 200 and resources, and may be associated with any job description or occupation 210. The data modules 200 may therefore be used for any associated job description or occupation 210 within any career path for a user. For example, the data module 200 defining a user's ability to organize and run a meeting may be associated with both a Junior Marketing Manager job description, or a Senior Marketing Manager job description.

As non-limiting examples, individual data modules 200 may include and define any combination of: one or more learning objectives 205 (also referred to as "can do" statements, e.g., "can organize and run a meeting"); a GSE or other competency score associated with the one or more learning objectives 205; one or more assets or other resources needed for the user to complete the one or more learning objectives 205 (e.g., instructional video, assessment questions); one or more skills improved through the one or more learning objectives 205 (e.g., reading, writing, speaking, listening); one or more career based tasks 210 (e.g., "socializing with foreigners") associated with the one or more learning objectives 205; one or more job descriptions/occupations associated with the one or more tasks 205 (e.g., Jr. Marketing Manager), and a means of course delivery (e.g., individual independent learning activities, peer-to-peer independent learning games, and/or teacher facilitated group learning).

Each data module 200 may include one or more tags. The tags may be the foundation for assembling the personalized course profile for each user. Each of the tags within each of the data modules may be machine readable, meaning that the data stored within the XML or JSON file, or database record for each data module, is in a format such as XML, JSON, CSV, SQL, etc. that is formatted to be readable by a computer to extract, transform and process data.

The tags may be used to identify and define each module 200 and/or the relationships between the data module 200 and other data modules 200 or resources. The data modules 200, individual tags, and other resources may therefore be associated in database 110 in a many-to-many relationship, so that multiple relationships may exist between many of the data modules 200 or tags within database 110. The tags within the data module 200, therefore, make up a specific taxonomy, which is used to feed an algorithm creating the personalized course assets 205, logic and rules 215, as well as other resources delivered to the user to accomplish their identified professional goals.

For example, each data module 200 for each learning objective 205 may include tags that associate the learning objective 205 with one or more professional goals, one or more can do statements 205, one or more GSE levels or scores, one or more assets 205, one or more skills 205, one or more tasks 210, one or more job descriptions 210, a price associated with the data module 200 etc. In some embodiments, tags may further be used establish a relationship between learning objectives 205 and the user profile 220 so that the user and the data modules required by the user to complete their personalized course are associated in database 110.

In embodiments described below, each personalized course profile may include a percentage of each learning objective 205 directed to a course delivery method, including individual, group and teacher-led learning. Each learning objective 205 may therefore include tags identifying the appropriate course delivery method for the learning objective 205.

Turning now to FIG. 3, in order for each user to create a user profile 220 and generate a personalized course profile, server 102 may generate, render and transmit one or more UIs to the user's client computer 104, 106. Each user may access the UI and generate data input, possibly using one or more UI controls as seen in FIG. 3, defining their career goals.

For example, in FIG. 3, each user may input their current job description 210, as well as the desired job description 210 they would like to achieve in order to complete their career goals. Three example millennial users may demonstrate how this may be accomplished.

Person A, a 20 year old student, may have professional goals including getting a good job after studies, passing a study exam, and improving his private life through self-development. Person A may therefore input student as his current job description 210, and Junior Marketing Manager as the job description 210 representing his professional goal. Person B, a 30 year old mother, may have professional goals including getting back into her job, supporting her child's education, and doing something for herself. Person B may therefore input mother as her current job description 210, and Concierge as the job description 210 representing her professional goal. Person C, a 35 year old white-collar worker, may have professional goals including taking his next career step, improving his job performance, receiving a certification; improving his international skills, and improving himself through self-development. Person C may therefore input Junior Marketing Manager as his current job description 210, and Senior Marketing Manager as the job description 210 representing his professional goal, as seen in FIG. 3.

In some embodiments, also demonstrated in FIG. 3, the user may input specific career-oriented learning objectives 205 representing their professional goals. For example, Person D, a 25 year old blue-collar worker, may have professional goals including improving her job performance and improving her private life through self-development. Person D (as well as Person B, described above) may therefore input "improve my capabilities to communicate and socialize with others, including foreigners" as a career-oriented learning objective 205.

As seen in FIG. 3, the user may also specify and emphasize or deemphasize the relative importance of specific skill areas (e.g., reading, writing, speaking, hearing/understanding, etc.). In embodiments such as that seen in FIG. 3, the user may designate a numerical weight to each skill. However, any means of emphasizing or deemphasizing specific skills may be employed. For example, a user may select a ranking of each of the listed skills, or respond to a generated survey to determine the importance of each skill to the user, etc.

Using Person C as an example, a blue collar worker may not be interested in reading or writing, only listening and speaking. Person C may therefore provide user input emphasizing listening and speaking, and deemphasizing reading and writing in order to achieve her goal of "improve my capabilities to communicate and socialize with others, including foreigners."

As seen in FIG. 3, each user may also define a duration of time over which the user would like to achieve their professional goals. For example, in FIG. 3, the user has identified a goal date by which they would like to complete their professional goals. In other embodiments, the user may, as non-limiting examples, identify an amount of time available during a typical month or week to dedicate to achieving their professional goals, or number of weeks or month, etc., by which they would like to accomplish all identified learning objectives to achieve their professional goals.

As previously noted, the disclosed embodiments may be optimized for a mobile environment. For example, in some embodiments (not shown), the user may select the job description representing their professional goal by receiving a display of available job descriptions stored as modules within database 110. The user may select additional job descriptions in this example by executing a "swipe," moving their finger or thumb to the top of the screen. The current job description may move upward and disappear, and a new job description appear from below. If the job description represents the user's professional goals, the user may swipe to the left of the screen, indicating that the job description represents the user's professional goals, or to the right, indicating that the job description does not represent the user's professional goals.

Similarly, the user may define the timeline to accomplish the identified learning objectives using a "pinch" action on a visualization of the timeline. For example, if the proposed timeline was longer than the user expected, the user may push their thumb and forefinger together on the screen to indicate that the timeline should be shorter. User's personalized profile may then be updated to reflect the user's desired timeline.

Server 102 may then use any machine learning or artificial intelligence known in the art to learn from the user's responses and further personalize the user's course. Thus, the user input may be used as training data to indicate that the rules 215 and other software instructions are providing the most accurate data for this feature. The server may receive the user input, and dynamically update/adjust the rules 215 and/or software to provide more accurate data in the next iteration, possibly using any artificial intelligence or machine learning technologies known in the art.

The input data reflecting each user's professional goals may be input and stored in association with a specific profile 220. Therefore, each user should be associated in database 110 with a user profile 220. If a user profile 220 does not exist, each user may access a user profile UI (not shown), which the user accesses to input personal data. As non-limiting examples, personal data may include a user's name, authentication data (e.g., username, password, etc.), contact data (e.g., phone/SMS number, email address), etc.

In some embodiments, the input personal data profile 220 may include personality or preference data about the user. For example, personality data may include user interests (enjoy waterskiing), specifics about the user (e.g., introvert/extrovert, does not respond well to pressure or criticism, preferred study habits and approaches, leadership in group settings, etc.) and so forth. In some embodiments, this data may be input by the user during a user survey or interview, or may be crawled with data extraction performed on the user's social media profiles, blogs, etc.

Each user may submit the data from the one or more UIs displayed on the user's client computer 104, 106, possibly by clicking a submit button as seen in FIG. 3. Client computer 104, 106 may transmit all input data to server 102, which may store the data within database 110 in association with the user's profile 220. If the user inputs user data for the first time, server 102 may insert data into database 110, creating a user profile 220, and further store the user's professional goal data in association with the user profile 220.

Server 102 may receive the data input and submitted from the UI, and create a course profile personalized to each user and including a collection of data modules 200 specifying learning objectives 205 required for the user to achieve their professional goals. Each personalized course profile may include one or more learning objectives 205 teaching the user one or more skills which the user must master to fulfill one or more tasks required in order to be proficient in the job description 210 the user has identified to achieve their professional goals. The learning objectives 205, skills, tasks, and job description 210 may therefore represent various dimensions, which server 102 uses to calculate, generate, and store each user's personalized course profile.

One dimension, referred to as the course length in this disclosure, may create a kind of continuum, where server 102 identifies a user's current GSE skills level, representing a starting point for the user's personalized course at one end. Server 102 may further identify a GSE skills level, associated with the user's input job description representing their professional goals, at the opposite end of the course length continuum, which represents the ending point for the length of the user's personalized course.

Server 102 may therefore generate the content for the personalized course profile by identifying the learning objectives 205 within any data modules 200 in the modular content database, which have been tagged or otherwise associated with GSE skill levels between the GSE skills level at the starting point of the course length continuum, and the GSE skill level at the end point of the course length continuum. The server may further identify all assets 205, modules 200, or other resources tagged or otherwise associated with the identified learning objectives 205 in the modular content database.

Server 102 may identify the GSE skills level at the end point of the course length continuum using any techniques known in the art for correlating tasks within a job profile 210 with proficiency requirements (e.g., skill based learning objectives) associated with one or more competency scores within a scoring framework (e.g., GSE skill level). For example, in some embodiments, server 102 may utilize the functionality provided by Pearson's JOB TOOLKIT.

In some embodiments, to identify the GSE skill level at the end point of the course length continuum, server 102 may query database 110 storing a collection of previously-integrated data, which has aggregated tasks, associated with job descriptions 210, with learning objectives 205, GSE levels, and associated skill data. As a non-limiting example, the table below demonstrates the aggregation of such data:

| Learning Objective | Skill | GSE Score | Task | Importance |
| --- | --- | --- | --- | --- |
| Can write a report explaining in detail a work-related problem, the actions taken, and the results of those actions. | Writing | 71 | Gather and organize information on problems or procedures. | 70 |
| Can scan a long text or a set of related texts in order to find specific information. | Reading | 63 | | |
| Can interpret the main message from complex diagrams and visual information. | Reading | 62 | Analyze data gathered and develop solutions or alternative methods of proceeding. | 70 |
| Can understand the main information in technical work-related documents. | Reading | 53 | | |
| Can use persuasive language to convince others to agree with their recommended course of action during a discussion. | Speaking | 74 | Confer with personnel concerned to ensure successful functioning of newly implemented systems or procedures. | 69 |
| Can take part in routine formal discussions conducted in clear standard speech in which factual information is exchanged. | Speaking | 60 | | |

-continued

| Learning Objective | Skill | GSE Score | Task | Importance |
|---|---|---|---|---|
| Can participate in extended, detailed professional discussions and meetings with confidence. | Speaking | 80 | Review forms and reports and confer with management and users about format, distribution, and purpose, and to identify problems and improvements. | 65 |
| Can understand complex technical work-related documents in detail. | Reading | 79 | | |
| Can carry out an effective, fluent interview, spontaneously following up on interesting replies. | Speaking | 72 | Interview personnel and conduct on-site observation to ascertain unit functions, work performed, and methods, equipment, and personnel used. | 65 |
| Can write a detailed report of work-related events. | Writing | 69 | | |
| Can link a logical series of ideas leading to a suggested conclusion in a written report. | Writing | 68 | Document findings of study and prepare recommendations for implementation of new systems, procedures, or organizational changes. | 65 |
| Can carry out a prepared interview, checking and confirming information as necessary. | Speaking | 57 | | |
| Can describe in detail a change in the way a business is run. | Speaking | 70 | Prepare manuals and train workers in use of new forms, reports, procedures or equipment, according to organizational policy. | 63 |
| Can present information related to the business in a formal discussion. | Speaking | 68 | | |
| Can write a report describing business plans and strategies in detail. | Writing | 76 | Plan study of work problems and procedures, such as organizational change, communications, information flow, integrated production methods, inventory control, or cost analysis. | 61 |
| Can describe in detail how a change will help the company, its employees, or its customers. | Speaking | 70 | | |
| Can write a detailed structured report on work-related topics. | Writing | 70 | Design, evaluate, recommend, and approve changes of forms and reports. | 61 |
| Can write a plan of action detailing a problem, how it will be fixed, and when. | Writing | 67 | | |

Using the job description 210 provided by the user to identify the user's career goals, server 102 may execute a database query to access the tasks within the integrated data associated with the identified job description 210. The query may further access the learning objectives 205 associated in the integrated data with the identified tasks 210, and the GSE level associated with each learning objective 205. Server 102 may then analyze the GSE level for each of the learning objectives 205 associated with the tasks and the job description 210, and calculate an overall GSE score required to achieve the user's career goals. Server 102 may calculate the overall GSE score from all GSE scores returned from the data query, for the job description 210 associated with the user's career goals. Server 102 may then identify the overall GSE score as the endpoint of the course length continuum, and store the endpoint in data storage in association with the user profile 220 and/or a personalized course associated with the user profile 220.

In embodiments where the job description, job-related tasks 210, learning objectives, and GSE skill level 205 for each learning objective 205 has not been integrated within the database 110, server 102 may generate integrated data (e.g., integrated data records) from two or more data sources. The first data source, possibly a job profile database, data table, data record, etc., may include one or more job profiles containing one or more job descriptions 210. Each job profile/description 210 may also include one or more required competencies including tasks required for competence in the associated job profile. As a non-limiting example, this profile may be populated using data from the O*Net database provided by the United States Bureau of Labor and Statistics, which provides thousands of job profiles that have already been created. Server 102 may access the profile data such as the O*Net database using any technology known in the art (e.g., web crawl, API access, database interface, etc.), and download the data to populate the first data source.

The second data source may include, or access data defining, a scoring framework (e.g., GSE level) defining a range of competency scores. The second data source may further include one or more proficiency requirements (e.g., skill-based learning objectives 205), each of which is associated within the data store with a competency score in the scoring framework (GSE score). Each user must be proficient in the learning objective 205 (e.g., has taken a test, has completed assignments, etc.) in order to achieve the competency score. Thus, in embodiments where the job description, job-related tasks 210, learning objectives 205, and GSE level for each learning objective 205 has not been integrated within database 110, server 102 may generate data (e.g., data records) integrating data from each of the two data sources.

If the server determines that no integrated data records exist in database 110, server 102 may require user input to aggregate the job profile data from the first data source with the learning objective 205 and GSE level data in the second data source. To aggregate this data, the server may therefore render a UI (not shown), displayed to a system administrator or other user on a UI of a client computer 104, 106, providing UI controls for the user to associate one or more learning objectives 205 in the second data source with one or more tasks 210 in the first data source. The user may input the data associating one or more learning objectives 205 with one or more job-related tasks 210, and submit the data to server 102.

Server 102 may receive and aggregate the input data as integrated data within database 110. For example, server 102 may generate one or more data records including, or joining, data fields including the task 210 from the job profile, an importance of the task, the learning objective(s) 205 associated with the task 210, and a skill and GSE score associated with each learning objective 205, as demonstrated in the table above.

Server 102 may also aggregate the data from the two data sources by identifying keywords that are common between data within the first data source and data within the second data source. Server 102 may identify these common keywords by tokenizing or otherwise identifying keywords within each of the data entries in the first data source and the second data source. For each learning objective data 205 in the second data source sharing common tokens or other keywords with the task data 210 in the first data source, server 102 may generate an integrated data record, associating and/or integrating the identified learning objective data 205, including the GSE score and associated skills, into the task data 210 sharing the common tokens or keywords. In some embodiments, the integrated data may be presented to the user for confirmation of its correctness.

Server 102 may also aggregate the data from the two data sources by accessing a talent management system (TMS) accessible to the server, and identifying a GSE skill level associated with a job description 210. The identified job description 210 may be equivalent within the TMS to the job description input by the user in association with the user's career goals. In these embodiments, an organization has previously associated one or more GSE scores with one or more job descriptions 210, including the tasks 210 and learning objectives 205 associated in database 110 with each job description 210. Server 102 may access the TMS, identify one or more job descriptions 210 within the TMS matching or equivalent to the user's input job description 210, and identify the GSE score associated with the matching job description 210 in the TMS. Server 102 may then aggregate all data record(s) associated with the identified job description, tasks 210, learning objectives 205 and GSE skill levels. In some embodiments, the integrated data may be presented to the user for confirmation of its correctness.

In some embodiments, Server 102 may query data from the integrated data, to identify, within the first data source and the second data source, records that have not been integrated. Server 102 may identify, within the integrated data, data that matches or is equivalent to the non-integrated records in the first data source or the second data source. Server 102 may then integrate the records in the first data source and the second data source that are equivalent to the integrated data. In some embodiments, the integrated data may be presented to the user for confirmation of its correctness.

Server 102 may identify the GSE skills level at the starting point of the course length continuum using any techniques known in the art for assessing the user's current overall and individual language skill from competency scores within a scoring framework (e.g., the user's current GSE score within the GSE). For example, in some embodiments, server 102 may utilize the functionality provided by Pearson's GSE PROGRESS.

Server 102 may generate the user's competency score from the assessment described below. For example, database 110 may store, in association with the user profile described above, one or more previous competency scores, such as a GSE score representing the user's results from a previous GSE assessment, or determined from current use of products that determine a GSE score. After the user is authenticated to the system, server 102 may query database 110 to determine the user's most recent or average assessment score, and this score may be used as the starting point of the course length continuum, or may represent a baseline score if the user engages with the assessment described below.

In embodiments where no previous assessment data is found in association with the user, server 102 may generate an assessment for the user as described below. Database 110 may store a collection of assessment questions 225 used to determine a user's language skill, such as the user's GSE level. Thus, a GSE score representing an appropriate GSE level may be stored in association with each assessment question 225 within database 110. The GSE score for each question 225 may be determined by presenting the question to a group of users, preferably language speakers of a variety of different languages and associated with different GSE levels, and scoring their responses. Questions 225 correctly answered by most users may be calibrated as a low skill assessment item while questions answered only by advanced users may be calibrated as a high skill assessment item. In some embodiments, each question 225 may also be associated with a skill (grammar skill, reading comprehension, vocabulary, etc.), and a GSE score assigned to each associated skill. Each question may also be associated in database 110 with a question type, including, for example, true or false, multiple choice, reading comprehension, or fill in the blank.

Each question 225 may also be associated in database 110 with a difficulty level (e.g., reading comprehension is more difficult than true false). Database 110 may also associate multiple weighted scores for questions 225 including multiple possible responses. For example, each answer for a multiple choice question may be weighted to reflect a best answer, a second best answer, and so forth.

In response to the user logging in and beginning the assessment, server 102 may generate a dynamic structure for the assessment questions 225 including a number of questions, and a randomly assigned question type for each of the questions 225. For example, server 102 may create a structure for a 4-question assessment including a fill in the blank question, a multiple choice question, a fill in the blank question, and a true or false question. In some embodiments, the logic in the software instructions executed by server 102, or database 110, may define rules 215 for server 110 to generate the structure for the assessment questions 225.

Server 102 may execute a query to select a first assessment question 225 from database 110. The query may specify that the question 225 match the question type defined in the dynamic structure generated by server 110, and further is associated with a GSE score matching the user's identified baseline GSE score from previous assessments. If server 102 cannot identify a baseline GSE score from previous assessments, server 102 may select a random question 225 of the proper question type to establish the baseline.

Server 102 may generate a UI for the user including the first assessment question 225 and transmit the UI to the user's client 104, 106 for display. The user may input a response for the question 225 and submit the UI for transmission to server 102. Server 102 may receive and score the response. Scores may be weighted according to the type of question. For example, a multiple choice question may carry greater weight in scoring the user's answer than a true false question. Furthermore, a multiple choice may be made up of a best answer, second best answer, third best answer, etc. The weight of the score for a multiple choice question may be scored accordingly. Server 102 may update the user's GSE score to reflect weighted score from their response to the question. The user's overall GSE score may be increased for correct questions, and decreased for incorrect questions.

The disclosed process may also calculate a skill level for one or more different skills during the testing. As non-limiting examples, a skill level for grammar and a skill level for vocabulary may be individually presented, scored and tracked, with scores saved in database 110. Server 102 may then select the next assessment question 225 for the user according to the user's updated GSE and/or skill score. This process may continue until all of the questions in the generated structure are complete.

The assessment process may be repeated until the user's GSE score is defined. The user's score may be more completely defined by selecting questions 225 based on the highest current CSE and skill scores for the user to determine the user's highest skill level. For example, users having a low overall language skill may be given true or false questions (an easy question type), users having an intermediate overall language skill may be given multiple choice questions (an intermediate question type) and users having an advance overall language skill may be given fill in the blank questions (a hard question type).

In some embodiments, the assessment may be divided into stages. The rules 215 in database 110 or defined in the software instructions may define a number of questions and/or time limit for each stage. In some embodiments, the stages may include stages to assess listening, speaking, and writing stages of the assessment.

Stages may include listening, speaking and writing assessments for the user. The listening assessment may include the user hearing a spoken word, phrase or sentence in a language, and typing the word, phrase or sentence into the user interface on the client device. The speaking portion of the assessment may include the user, after reading a word, phrase or sentence, responding by speaking the word, phrase or sentence into a microphone on the client device 104, 106. The writing portion of the assessment may include the user, after hearing a word, phrase or sentence, responding by writing the word, phrase or sentence into a field or area in the UI. The response of the user may be recorded, scored and stored in database 110.

As previously noted, the disclosed embodiments may be optimized for a mobile environment. For example, in some embodiments (not shown), the user may respond to multiple choice questions by executing a swipe in various directions, as described above, to indicate the correct intended question for the assessment question.

The user input may be used as training data to indicate that the rules 215 and other software instructions are providing the most accurate data for this feature. The server may receive the user input, and dynamically update/adjust the rules 215 and/or software to provide more accurate data in the next iteration, possibly using an artificial intelligence or machine learning technologies known in the art.

In addition to defining the length of the user's personalized course from the end point based on the user's career goals, and the start point based on the user's assessment, described above, server 102 may calculate, generate, and store a second dimension to the personalized course profile, referred to in this disclosure as course depth. This course depth may identify specific skills within the learning objectives 205 associated with the learning objectives 205 in course length dimension, which the user prefers to emphasize or deemphasize, and therefore refers to the "depth" of specific skills learned during each learning objective 205. Using the example of Person D above, a blue collar worker may only be interested in speaking and understanding to achieve the career-oriented learning objective of "improve my capabilities to communicate and socialize with others, including foreigners."

As noted above, each module 200 may also include tags defining a skill (reading, writing, speaking, listening/understanding) associated with the module 200, so that if user's deemphasize those skills for their personal profile, the module will not be included, or less of that particular skill will make up the user's personalized course. Server 102 may generate a UI including all learning objectives 205 and their associated skills, as demonstrated in the example embodiment in FIG. 4. In this embodiment, server 102 has queried database 110 to identify all learning objectives 205 containing tags associating the learning objective 205 with a GSE score within the starting point GSE score and the end point GSE score determined from the length dimension of the user's personalized course profile. Server 102 may render a UI including an ordered list of the learning objectives 205, and may transmit the UI to the user's client computer 104, 106 for display, as seen in FIG. 4.

Server 102 may receive input from the user indicating that the user wants to remove and/or deemphasize the importance of specific skills within their personalized profile. For example, Person C above, who is interested in a position as a Senior Marketing Manager, will likely not delete any of the presented skills, as all are important for Person C to achieve their professional goals. However, Person D, who is only interested in communicating and socializing with co-workers in a blue-collar environment, may input data indicating that writing and reading skills should be deemphasized. Thus, using the UI in FIG. 4, Person D would remove the reading and writing skill based learning objectives 205 from their personalized course profile.

In some embodiments, server 102 may use the user's input of weighting of specific skills, demonstrated in FIG. 3, to automatically delete or assign weight to all learning objectives 205 containing tags indicating skills below the user's indicated weight. In some embodiments, the tags may be fined tuned so that there is a weight assigned to the skill associated with that module 200. If the user weights that skill below the threshold, the modules 200 tagged with a number higher than that weight will not be included.

With the length and depth of the user's personalized course defined, server 102 may generate and present the final personalized course to the user. To accomplish this, server 102 may assemble all identified data modules 200 associated with each of the learning objectives 205 from database 110 and aggregate them into the personalized course for the user. Server 200 may then update database 110 to associate the modules 200, and/or learning objectives with their associated assets 205, with the user profile 220. The server may determine the final cost of the user's personalized course by determining the unit cost of each of the data modules 200 included in the personalized course from the module price tags disclosed above, and adding each of these unit costs together to generate a total cost for the course.

As a non-limiting example, Person C, a Junior Marketing Manager, may have a career goal to be promoted to Senior Marketing Manager. Server 102 may complete the method steps described above, and determine that such a promotion requires 20 learning objectives to fulfill the user's career goals. Server 102 may then access the data modules 200 and analyze the associated tags to identify and generate the list of learning objectives 205, including all identified skills and assets associated with the learning objectives 205 for a Senior Marketing Manager. Server 102 may further generate an approximate timeline to complete it based on the user's timeline input (e.g., 40 weeks). If the user indicates a desire to access these learning objectives and/or assets 205, server 102 may retrieve the assets for the user and display them on the UI. Thus, server 102 may generate a UI for the user, which the user may access, after authentication to the system, to begin their course. The UI may include an ordered list of learning objectives 205, with links or other UI controls providing the user access to the assets associated with each of the learning objectives 205. FIG. 5 demonstrates a non-limiting example of the generated UI with a single learning objective.

The user's personalized course follows a self-study methodology complemented with peer-to-peer learning and instructor-led group activities. In other words, as noted above, each data module 200 for each learning objective 205 within the user's personalized course may be associated in database 110 with a tag indicating a method of course delivery. Server 102, while generating the ordered list on the UI, may identify the course delivery tag associated with each learning objective 205 data module 200, and group the learning objectives 205 into three lists, each containing the appropriate learning objectives 205 for self-study, peer-to-peer, or instructor-led activities. The list may also indicate a gateway between each stage, notifying each user that they have completed the stage and should move to the next stage.

In some embodiments, rules 215 for software instructions in database 110 may define a ratio of each stage of course delivery. For example, in some embodiments, 70% of the data modules 200 associated in database 110 with learning objectives 205 should contain tags identifying the course delivery method as self-study, 20% should contain tags identifying the course delivery method as peer-to-peer, and 10% should contain tags identifying the course delivery method as instructor-led.

The self-study stage of the course delivery may include individual independent learning activities for practicing the skills needed for the identified learning objective 205. As non-limiting examples, such learning activities may include reviewing assets such as reading materials or topic-relevant video content, writing assignments, etc. The example UI in FIG. 5 demonstrates a non-limiting example of the generated UI, as the user transitions from the self-study stage to the peer-to-peer stage.

In this example embodiment, the user may access all resources needed for the self-study portion of the personalized course. Here, the user is focused on the learning objective 205 "Can response effectively to emails requesting work info." Server 102 may render the UI, including links or other means of accessing the learning objective 205 and any associated assets. For example, the user, on selecting the Begin Course link, may be provided access to reading materials, video content, virtual reality environments, etc. associated with the learning objective 205.

During the self-study and peer-to-peer stages, UI controls available to the user may receive questions from the user about the content of the learning objectives 205. Server 102 may receive these questions and utilize chatter robot (i.e., chatbot or chatterbot) technology to respond to the user(s)' questions in a tone configured to put the user at ease by simulating small talk or casual conversation in a tutor-like environment. The chatterbot technology may comprise a computer program comprising a type of conversational agent, designed to simulate an intelligent conversation with one or more human users via auditory or textual methods.

Database 110 may store a corpus of frequently asked questions or other chatterbot content for all modules 200 at the individual and peer-to-peer levels. Server 102 may identify the subject matter of the question, match the subject matter with the frequently asked question and answers available within database 110, and personalize the answer response, according to the user's profile 220. Using the mobile optimization technology described above, users may update/adjust the usefulness of the chatterbot responses, both individually and generally. For example, if the user does not find the chatterbot response useful, they may swipe left to indicate a non-useful response. Similarly, if the tone of the chatterbot response is not palatable to the user or otherwise does not match the user's personality and/or preferences stored in their user profile 220, the user may swipe down, etc.

Additional links for each of the data modules 200 and/or learning objectives 205 presented to the user may allow users to complete and submit one or more assignments during the self-study portion of the personalized course to prepare for a user assessment at the module's 200 conclusion. As the assignments are completed and submitted, server 102 may generate an assessment of the user's self-study practice activities before proceeding to the peer-to-peer or teacher-led stages of the learning objective. After receiving the user's assignments and responses to the assessment, server 102 may evaluate the user's individual progress.

Students may proceed with the modules 200 and/or learning objectives 205 within their personalized course at their own time and pace. In some embodiments, the pace of the self-study stage may be determined by the timeline provided by the user, as demonstrated in FIG. 5 (i.e., goal date of Jan. 1, 2017). The server may track the progress of the user according to calculations determined from this timeline.

As each assessment is completed, server 102 may analyze the responses associated with each asset to determine the effectiveness of the asset 205. If all students are performing poorly on assessment questions related to a specific asset 205, server 102 may remove the asset 205 from the content database 110 and replace it with another asset 205. Server 102 may then repeat the process until the effectiveness of the asset 205 associated with the poorly performing assessment question improves. Server 102 may repeat this process for the analogous peer-to-peer and teacher-led learning objectives and assets.

On an individual level, server 102 may evaluate the user's assignments and assessment responses, as well as the user's general progress through the personalized course, and generate one or more reports indicating the user's performance. As non-limiting examples, the report may include a percentage of completed course goals for the personalized course, their weaknesses in specific skills areas (e.g., vocabulary, grammar, reading, writing, speaking listening), the user's progress through their personalized goals as compared to a class average, and, where the user has provided a preferred timeline, the user's progress according to the timeline. The server may repeat this process for the analogous peer-to-peer and teacher-led learning objectives and assets 205.

In some embodiments, server 102 may analyze the user's performance on assignments and assessments of each data module 200 and/or learning objective 205. Server 102 may then generate and transmit personalized messages to the user to motivate and/or encourage them according to their performance on the assignments and/or assessments, as demonstrated in FIG. 5. For example, WECHAT messaging technology may be used to assess the user's performance and generate appropriate messages.

In some embodiments, database 110 may store a collection of messages, possibly as data records or modules 200 tagged in a manner similar to that described above. Each module or personalized message data may include: a message content offering encouragement or motivation; a message type (e.g., motivating if the user is not performing well, encouraging if the user is performing well), a trigger defining the timing to send message (e.g., performing ahead of or behind schedule, low performance threshold); a user personality type matching the message (e.g., needs strict motivation, stubborn, easy going, shy, doesn't handle criticism well), etc.

Various checkpoints may be established in the rules 215 triggering the evaluation of the user's performance and whether the messages should be transmitted to the user. For example, after each assignment is submitted and evaluated, or at the conclusion of an assessment, server 102 may score the user and/or compare the user's progress with their established timeline. Server may then identify the appropriate message type for the user. For example, if the user scores low or is behind schedule, server 102 may query database 110 to identify data including tags identifying the message as motivating the user to accelerate their work. Such messages may also include tags identifying resources that may help users that scored poorly. The selected messages may be collected and refined as below.

In addition to identifying appropriate messages, server 102 may personalize the messages to each user by identifying message data including tags matching specific preferences and personality traits for each user. As noted above, users may specify, within their user profile 220, specific preferences or personality traits. In determining the appropriate messages to send to users, server 102 may identify message data including tags matching the preferences or personality traits defined in each user's user profile 220. Once server 102 matches the tags within the message data to the preferences and personality type in the user's profile 220, server 102 may transmit the message to the user's client computer 104, 106 for display.

As previously noted, the disclosed embodiments may be optimized for a mobile environment. For example, in some embodiments (not shown), the user may respond to the personalized messages by executing a swipe in various directions, as described above, to indicate that the personalized message is properly calibrated for the user's preferences and/or personality type.

The user input may be used as training data to indicate that the rules 215 and other software instructions are providing the most accurate data for this feature. The server may receive the user input, and dynamically update/adjust the rules 215 and/or software to provide more accurate data in the next iteration, possibly using an artificial intelligence or machine learning technologies known in the art.

As seen in FIG. 5, server 102 may determine that the user has passed a gateway from individual to group study. Server 102 may generate a notification to the user and display it on the UI, as seen in FIG. 5. Server 102 may also determine the team members of the small groups in the peer-to-peer stage of the user's personalized course. In some embodiments, the rules 215 may define restrictions on the size of such teams. For example, in one embodiment, a team can have no more than 5 members.

Server 102 may identify the groups for the peer-to-peer stage of the user's personalized course according to common characteristics or attributes within the user profiles 220 of all users in database 110. For example, the most obvious common characteristic or attribute may include user profiles storing identical, or closely similar modules 200 within their personalized course.

The server may also select, from user profile data 220, similar or common sentiment, personality traits, motivations, GSE scores, assignment and assessment scores and timeliness, chatterbot questions and responses, interests based on profiles, profile updates, etc. to determine the small groups for the peer-to-peer stage.

Server 102 may then generate a UI comprising a list, the list including at least one user profile sharing one or more common attributes listed above. Each user may then select preferred members of the group. In some embodiments, these selections may be made using the mobile optimized technology described above, so that the user swipes up down left and right to select preferred teammates with preferred matching personality, temperament, etc. traits.

It should be noted that during the individual and peer-to-peer stages of the user's personalized course, the students are learning, or learning together for the peer-to-peer stage, based on structured activities, but without the control of any teacher. Thus, the assessment options are either self- or peer-assessment. As a non-limiting example, during the individual stage, the student may access the learning objectives for learning to organize and lead a meeting. One of the components of this may include learning and performing an assessment of different components of a meeting agenda. The user may individually access the assets for these components, and their progress may be assessed without teacher supervision or control. Similarly, in group learning, the group may be given an assignment to prepare and conduct a meeting with no previous templates or other resources. The members of the group in the peer-to-peer stage may work together to both complete the assignment and assess each other. The disclosed system may also assess the final product (e.g., the agenda) completed by the group to determine that they have completed the learning objectives needed to move on to the teacher-led stage. Thus, the assignments may be completed and assessments determined in a structured group learning environment, but also in an uncontrolled environment, in group learning, without a teacher.

At the conclusion of the peer-to-peer stage, server 102 may generate and display a notification that the user has again passed a gateway from peer-to-peer to the teacher-led stage of their personalized course. The server may then update the user's personal profile to reflect the user is a member of the virtual classroom for the third phase of the user's personalized course.

Server 102 may allocate students to a teacher for assessment in a teacher-led environment. In some embodiments, this environment may be a virtual reality (VR) environment. As a non-limiting example, a learning objective may include running a meeting. A user may learn and practice the principles of putting together a meeting agenda in the individual stage, the group may come together to create a meeting agenda in the peer-to-peer stage, and the group may present their meeting agenda, and/or run the meeting, in a VR setting in front of the group for assessment by the teacher. At the conclusion of each learning module 200, each student may then proceed with their next learning objective 205.

Figure 6:
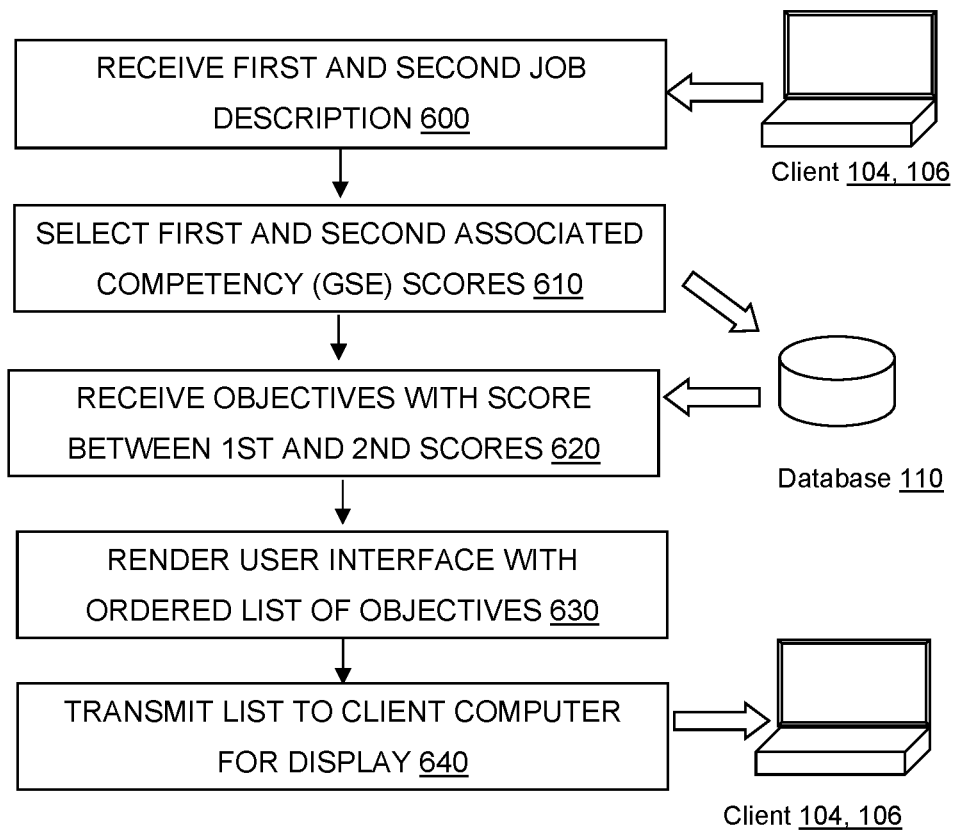
FIG. 6 is a flow chart illustrating an example embodiment of automatically generating a personalized course profile.

FIG. 6 is a flow diagram demonstrating the method steps performed by one or more processors executing software instructions within a memory coupled to a server computer 102. The server computer 102 is coupled to a network and configured to receive, from a first user interface on a client computer 104, 106 coupled to the network, a user data input comprising a first job description 210 and a second job description 210 (Step 600). Server 102 then executes a query to select, from a database 110 coupled to the network: a first competency score stored in the database 110 in association with the first job description 210; a second competency score stored in the database in association with the second job description 210 (Step 610); and a plurality of objectives 205, each stored in the database 110 in association with a third competency score above the first competency score and below the second competency score. Server 102 then generates a personalized course profile comprising the plurality of objectives (Step 620) and renders a second user interface comprising an ordered list of the plurality of objectives and at least one user interface control configured to access each of the plurality of objectives (Step 630); and transmits the second user interface to the client computer for display (Step 640).

In summary, the disclosed embodiments reinvent the traditional PLS model and create a Virtual PLS model for the language learners, moving the model into the digital age. These embodiments offer truly personalized language courses (through length and depth, discussed above) for each user based on their professional goals, as well as a ubiquitous mobile and social experience designed around the expectations of the Millennial generation. They apply the proven digital economics to make serious pedagogically sound and financially viable digital learning more affordable. The data driven self-study component in the course may measure efficacy.

One main differentiator in the disclosed embodiments is course personalization, or in other words, the ability to personalize the course around the learning objectives of each user via the application of the GSE Job Toolkit. Using this model, the professional goals of each user may be determined. For example, students may want to be prepared for a specific job, stay-at-home mothers may want to go back into a specific job, blue-collar workers may want to do better in their current job, and white-collar workers may want to be promoted to the next level. This model may also identify the GSE learning objectives for the professional goals of each user. For example, the Job Toolkit may align the job profiles from the O*NET database to the GSE learning objectives. Finally, this model may personalize the course for each user. For example, a user seeking a course for an Executive Assistant role may provide input which generates a course defining an entry level, a skills profile, and one or more learning objectives, as well as a course length and course depth, according to the description above.

The course configuration may include a model allowing system administrators to use the concept of a modular and tagged content database to assemble the personalized courses for each user. For example, the system may use a modular content database. The assets in the database need to follow a specific taxonomy. As non-limiting illustrative examples, the database may include two tables, each of which include columns or data fields for "Criteria," "Asset 1," and "Asset n." The first table may include Criteria such as: O*NET Task Statement; GSE Learning Objective; GSE Skills Profile; and/or GSE Score/CEFR. The second table may include Criteria such as: Activity Type (e.g., Video); Purpose (e.g., Practice); and/or Delivery (e.g., Self-Study). The tagged assets may be the foundation to assemble the courses, so that each user may have specific and personalized learning objectives.

The course pedagogy may include a course that follows a self-study methodology complemented with peer-to-peer learning and instructor-led group activities, possibly including a continuum or step by step process from a Learning Objective to a Learning Outcome, and further including one or more Individual Independent Learning Activities, and one or more Peer-to-Peer Independent Learning Games, with a Gateway between them. The steps between the Learning Objective and Learning Outcome may further include Teacher Facilitated Group Learning with a Gateway between the Peer-to-Peer Independent Learning Game(s) and the Teacher Facilitated Group Learning. The Individual Independent Learning Activities may include an additional first step wherein students follow their courses at their own time and pace. The Gateway between the Individual Independent Learning Activities and the Peer-to-Peer Independent Learning Game(s) may include an additional second step including an assessment of practice activities before the next stage. The Peer-to-Peer Independent Learning Game may include an additional third step wherein students are grouped with other students, and fourth step where students will undertake group work activities. The Teacher Facilitated Group Learning may include an additional fifth step wherein students are allocated to a teacher for the assessment, and the Learning Outcome may include an additional sixth step where students can move on to the next learning objective.

Course Delivery may include the Learning Objectives, Learning Outcomes, Individual Independent Learning Activities, Peer-to-Peer Independent Learning Game(s), Teacher Facilitated Group Learning, and Gateways described above. With a content database approach, the disclosed embodiments can create mobile-first assets to overcome the classical problem of fitting non-appropriate assets into a mobile learning environment. Individual Independent Learning Activities may include self-study learning, no contact with teachers, and no contact with other learners. Peer-to-Peer Independent Learning Games may include collaborative learning, no contact with teachers, and direct contact with other learners, and Teacher Facilitated Group Learning may include group learning (virtual classes), direct contact with teachers, and direct contact with other learners. Instead of group learning, one-to-one sessions with a teacher could also be offered.

The instructor model may include connecting learners and teachers for a commission, but not employing teachers. Nevertheless, teachers may be provided with heavy teacher training, for which they may be charged. A rigorous rating system may secure the quality of virtual teaching.

The data layer within the model of the disclosed embodiments may apply current thinking around data-driven product development and data-enriched learning experience. The model including the Learning Objective, Learning Outcome, Individual Independent Learning Activities, Peer-to-Peer Independent Learning Games, Teacher Facilitated Group Learning and Gateways described above may provide Product Analytics creating a virtuous product development cycle, as well as Learning Analytics, informing the teachers about the learner's progress. For example, a report on the learner's achievements may include a percentage of course goals achieved, progress through goals compared to class average (e.g., "You're below average, get your act together"), progress verses time (e.g., Status—red. Your study plan is behind schedule"), weaknesses (e.g., "In Vocab, Grammar, Reading, Writing, Speaking, Listening"), and/or teacher alerts.

The school experience may include testing and integrating different tools to give the Virtual PLS the formal character of a school which is informing, supporting, and encouraging learners. For example, these tools may include WeChat Messaging, Chatbot Tutoring, and Virtual Reality. WeChat Messaging may include exploring the idea of sending regular text messages to learners (e.g., schedules, progress), given that studies have shown the positive impact of messaging on learners' progress. Chatbot Tutoring may include exploring the idea of using chatbots for simple(r) bot-to-human interactions (e.g., practice material). Virtual reality may include exploring the idea of using virtual reality and 360 videos to provide an engaging learning environment.

The Efficacy Framework includes developing the entire Virtual PLS model around the delivery of learning outcomes based on initial empirical research and market knowledge. The VPLS is designed around the delivery of concrete professional learning outcomes per persona (e.g., students, mothers, blue-collar, and white collar), divided into Aspiration (what learners want to achieve), Competence (what standards learners need to reach), Engagement (how learners are expected to study), and Access (how easy the source is to access and use). Aspiration may include getting a good job after studies, getting back into a former job, improving current job performance, and taking a next career step. Competence may include achieving specific learning objectives (e.g., 'can do xyz'), and focusing on specific language skills (e.g., reading). Engagement may include short bursts of studies, multimedia expectations, need for constant motivation and need for quick recognition. Access may include using the course on-the-go, learning at specific moments, an intuitive user experience, and fitting into digital habits.

In short, the Virtual PLS may become a worldwide language school offering truly personalized courses for users according to their professional goals. First, the GSE allows each course to be personalized based on a mapping of professional goals with learning objectives. Second, each course may be assembled via a mobile-first asset database and delivered via a blended learning approach, and third, VPLS is a unique opportunity as it overcomes the one-to-many model within existing courseware and delivery businesses.

The invention claimed is:

1. A system comprising:
a server computer coupled to the network and comprising at least one processor executing instructions within a memory that, when executed, cause the system to:
receive, from a first user interface on a client computer coupled to the network, a user data input comprising a first job description of a current occupation held by a user, and a second job description;
execute a query to select, from a database coupled to the network:
a first competency score within a framework indicating reading, writing, or speaking proficiency levels for learning objectives, stored in the database in association with the first job description; and
a second competency score within the framework, stored in the database in association with the second job description;
generate a personalized course profile comprising a plurality of objectives, each associated in the database with the second job description and each comprising a task representing a level of competency of reading, writing, or speaking a language that an employee for a job matching the second job description must reach to qualify for the job, wherein, upon completion of the plurality of objectives, a software logic within the system generates a third competency score for a subject, indicating a completion of the plurality of objectives at the level of competency of reading, writing, or speaking the language, that is above the first competency score;
render a second user interface comprising an ordered list of the plurality of objectives, personalized to the user, and at least one user interface control configured to access each of the plurality of objectives; and
transmit the second user interface to the client computer for display.

2. The system of claim 1, wherein:
the first job description is associated in the database with a first job profile for a current occupation of a user operating the client computer; and
the second job description is associated in the database with a second job profile for a career goal for the user.

3. The system of claim 1, wherein:
the first competency score and the second competency score comprise a skill level for a language;
the first competency score comprises an assessment score for an assessment of the skill level for the language; and
the plurality of objectives are each stored in the database in association with a third competency score above the first competency score and below the second competency score.

4. The system of claim 1, wherein the personalized course profile is stored in the database in association with a user profile for a user operating the client computer.

5. The system of claim 1, wherein the client computer is optimized for a mobile device platform.

6. The system of claim 1, wherein each of the plurality of objectives is stored in the database in association with at least one tag defining a course delivery method comprising:
a self study stage of the personalized course profile;
a peer-to-peer stage of the personalized course profile; or
a teacher-led stage of the personalized course profile.

7. The system of claim 6, wherein, if the course delivery method comprises a peer-to-peer stage of the personalized course profile, the instructions cause the server computer, prior to the peer-to-peer stage of the personalized course profile, to:
execute a database query selecting, from the database, at least one user profile comprising a common attribute with a user profile for a user operating the client computer;
generate a user interface comprising a list including the at least one user profile; and
receive, from the client computer, a selection from the list.

8. The system of claim 1, wherein the instructions further cause the server computer to:
score a user's performance for an electronically submitted assignment or assessment associated in the database with at least one of the plurality of objectives;
automatically generate an electronic message personalized to the user and reflecting the user's performance; and
transmit the electronic message to the client computer.

9. The system of claim 1, wherein the instructions further cause the server computer to:

receive, from the client computer, in association with at least one of the plurality of objectives, an input comprising a question;

execute a query selecting at least one answer to at least one frequently asked question within the database associated with the question;

generate an electronic message comprising the at least one answer personalized to the user; and transmit the electronic message to the client computer.

10. A method, comprising the steps of:

receiving, by a server computer coupled to a network and comprising at least one processor executing instructions in a memory, from a first user interface on a client computer coupled to the network, a user data input comprising a first job description of a current occupation held by a user, and a second job description;

executing, by the server computer, a query to select, from a database coupled to the network:
- a first competency score within a framework indicating reading, writing, or speaking proficiency levels for learning objectives, stored in the database in association with the first job description; and
- a second competency score within the framework, stored in the database in association with the second job description;

generating, by the server computer, a personalized course profile comprising a plurality of objectives, each associated in the database with the second job description and each comprising a task representing a level of competency of reading, writing, or speaking a language that an employee for a job matching the second job description must reach to qualify for the job, wherein, upon completion of the plurality of objectives, a software logic within the system generates a third competency score for a subject, indicating a completion of the plurality of objectives at the level of competency of reading, writing, or speaking the language, that is above the first competency score;

rendering, by the server computer, a second user interface comprising an ordered list of the plurality of objectives, personalized to the user, and at least one user interface control configured to access each of the plurality of objectives; and transmitting, by the server computer, the second user interface to the client computer for display.

11. The method of claim 10, further comprising the steps of:

associating, by the server computer, the first job description in the database with a first job profile for a current occupation of a user operating the client computer; and associating, by the server computer, the second job description in the database with a second job profile for a career goal for the user.

12. The method of claim 10, wherein:

the first competency score and the second competency score comprise a skill level for a language;

the first competency score comprises an assessment score for an assessment of the skill level for the language; and the plurality of objectives are each stored in the database in association with a third competency score above the first competency score and below the second competency score.

13. The method of claim 10, further comprising the steps of storing, by the server computer, the personalized course profile in the database in association with a user profile for a user operating the client computer.

14. The method of claim 10, further comprising the step of optimizing, by the server computer, the client computer for a mobile device platform.

15. The method of claim 10, further comprising the step of storing, by the server computer, each of the plurality of objectives in the database in association with at least one tag defining a course delivery method comprising:
- a self study stage of the personalized course profile;
- a peer-to-peer stage of the personalized course profile; or
- a teacher-led stage of the personalized course profile.

16. The method of claim 15 further comprising the steps of, if the course delivery method comprises a peer-to-peer stage of the personalized course profile, prior to the peer-to-peer stage of the personalized course profile:

executing, by the server computer, a database query selecting, from the database, at least one user profile comprising a common attribute with a user profile for a user operating the client computer;

generating, by the server computer, a user interface comprising a list including the at least one user profile; and receiving, by the server computer, from the client computer, a selection from the list.

17. The method of claim 10, further comprising the steps of:

scoring, by the server computer, a user's performance for an electronically submitted assignment or assessment associated in the database with at least one of the plurality of objectives;

automatically generating, by the server computer, an electronic message personalized to the user and reflecting the user's performance; and transmitting, by the server computer, the electronic message to the client computer.

18. The method of claim 10, further comprising the steps of:

receiving, by the server computer, from the client computer, in association with at least one of the plurality of objectives, an input comprising a question;

executing, by the server computer, a query selecting at least one answer to at least one frequently asked question within the database associated with the question;

generating, by the server computer, an electronic message comprising the at least one answer personalized to the user; and transmitting, by the server computer, the electronic message to the client computer.

* * * * *

UNITED STATES PATENT AND TRADEMARK OFFICE
CERTIFICATE OF CORRECTION

PATENT NO. : 11,776,080 B2
APPLICATION NO. : 15/783547
DATED : October 3, 2023
INVENTOR(S) : Christoph Grau It is certified that error appears in the above-identified patent and that said Letters Patent is hereby corrected as shown below:

In the Specification

Column 4. Line 48, "cat'" should be --'at'--.

Signed and Sealed this
Twelfth Day of December, 2023

*Katherine Kelly Vidal*
Katherine Kelly Vidal
*Director of the United States Patent and Trademark Office*